United States Patent [19]

Willis

[11] Patent Number: 5,071,061
[45] Date of Patent: Dec. 10, 1991

[54] REUSABLE ROUTING POUCH

[75] Inventor: Dale R. Willis, Roy, Utah

[73] Assignee: The United States of America as represented by the Secretary of the Air Force, Washington, D.C.

[21] Appl. No.: 376,276

[22] Filed: Jul. 5, 1989

[51] Int. Cl.⁵ .................. B65D 27/04; B65D 27/06
[52] U.S. Cl. .................. 229/303; 229/1.5 R; 229/71
[58] Field of Search .......... 229/1.5 R, 71, 72, 73, 229/77

[56] References Cited

U.S. PATENT DOCUMENTS

| | | | |
|---|---|---|---|
| 679,558 | 6/1901 | Gays | 229/53 |
| 827,208 | 7/1906 | Boston | 229/73 |
| 1,354,092 | 9/1920 | Crate | 229/73 |
| 1,926,066 | 2/1932 | Scholl | 229/55 |
| 2,619,277 | 12/1948 | Shuman | 229/55 |
| 2,980,315 | 4/1961 | Miner | 229/73 |
| 3,189,254 | 6/1965 | Pattishall | 229/92.8 |
| 3,310,225 | 8/1965 | Hoblit | 229/62 |
| 3,325,084 | 10/1967 | Ausnit | 229/77 |
| 3,557,853 | 5/1969 | Jones | 150/7 |
| 3,692,233 | 9/1972 | Carter, Jr. | 229/71 |
| 3,856,198 | 12/1974 | Daley | 229/71 |
| 4,477,013 | 10/1984 | Herrin | 229/1.5 R |
| 4,602,734 | 7/1986 | Thompson | 229/77 X |

FOREIGN PATENT DOCUMENTS

| | | | |
|---|---|---|---|
| 2397339 | 3/1979 | France | 229/71 |
| 231501 | 3/1944 | Switzerland | 229/73 |

Primary Examiner—Stephen Marcus
Assistant Examiner—Jes F. Pascua
Attorney, Agent, or Firm—Frederic L. Sinder; Donald J. Singer

[57] ABSTRACT

A pair of improved reusable routing pouches, or envelopes, are disclosed. The first routing pouch includes a single address block made of erasable material which can be covered by a transparent portion of the pouch closure flap. Addresses can be easily written and then erased by wiping so that the routing pouch can be reused indefinitely. The transparent portion of the closure flap covers the written address so that it will not smear or smudge during transit. The second routing pouch has a conventional series of consecutive address blocks printed on its surface, but is made of a material that is erasable by adhesive removal. After all the spaces have been filled in, an adhesive coated roller is roller over the pouch to remove the addresses and ready the pouch for reuse. A variation of the second routing pouch is erased by wiping with a cloth or sponge impregnated with a solvent.

3 Claims, 3 Drawing Sheets

REUSABLE ROUTING POUCH

RIGHTS OF THE GOVERNMENT

The invention described herein may be manufactured and used by or for the Government of the United States for all governmental purposes without the payment of any royalty.

BACKGROUND OF THE INVENTION

The present invention relates generally to reusable routing pouches, and more specifically to a novel reusable routing pouch with an erasable address block.

Reusable routing pouches, mailers or envelopes are commonly used in multiple office organizations to deliver written and other material between offices. Reusing envelopes is convenient and saves money.

Reusable routing pouches are typically made of kraft or other strong paper material and generally share three primary features—multiple address blocks, view holes and a reclosable closure flap.

Multiple address blocks are a series of consecutively-arranged spaces, or blocks, for writing in successive destination identifiers, or addresses. In use, the immediately previous address is marked through and the next address, or routing, block filled in with the new address. The marked-through previous address may also serve as a return address, but more often, because of insufficient marking through causes misrouting. The pouch can be continuously reused until all the address blocks are filled. To increase the number of times the pouch can be used, address blocks are generally printed on both sides of an envelope.

View holes are openings extending through two sides of the pouch material so that it is easily determined whether or not the pouch is empty.

Reclosable closure flaps seal material inside the pouch and include means for successively attaching and detaching the flap. The most common attachment means is a pair of grommeted buttons made of fiber material. One button is riveted on the outside of the flap and the other on the back of the pouch below the bottom edge of the closed flap. A string is permanently attached to one of the buttons so that it can be wound around both buttons to hold the flap closed. More recently, alternatives have appeared to address the problem of the time and complexity required in using button and string type fasteners. Tabs coated with new long-lasting tacky adhesives, which can be repeatedly attached and detached, have been used on the flaps of some newer pouches.

Unfortunately, current reusable routing pouches can only be used until all address blocks have been filled. They are then generally discarded, even though they are otherwise still usable. Even the general practice of printing address blocks on both sides of an envelope is still limited by the total surface area available on the envelope.

Further, the view holes, despite their utility, sacrifice much of the protection from the environment otherwise provided by the pouch or envelope.

Thus it is seen that there is a need for reusable routing pouches that do not have to be discarded when all the address blocks are filled, and for reusable routing pouches that preserve the utility of view holes without sacrificing the protection of an enclosure.

It is, therefore a principal object of the present invention to provide a reusable routing pouch with reusable address blocks.

It is another principal object of the present invention to provide a reusable routing pouch that provides an indication of whether or not it is empty without sacrificing protection for its contents.

It is an object of the present invention to make economical the use of high strength and water resistant plastics for reusable routing pouches by increasing the number of times each pouch can be used.

It is another object of the present invention to provide an improved pouch flap fastening means.

It is yet another object of the present invention to provide a means for protecting written-in addresses from being smudged or wiped off.

It is a feature of the present invention that it is stronger, more tear resistant and more waterproof than present reusable routing pouches.

It is an advantage of the present invention that it is less expensive to use than prior art reusable routing pouches.

These and other objects, features and advantages of the present invention will become apparent as the description of certain representative embodiments proceeds.

SUMMARY OF THE INVENTION

The present invention provides an improved reusable routing pouch with a reusable address block. The unique discovery of the present invention is that the solution to the problem of the limited number of times current reusable routing pouches can be reused is to make the limiting factor itself reusable. By making the address block erasable, so that it is also reusable, the problem is solved. Another unique discovery is that address blocks of very easily erasable material can be used without the problems of smudging and smearing by covering the address block with a transparent portion of the pouch flap. A further unique discovery is that the useful function of view holes, that they provide visibility into the inside of the pouch can be both preserved and improved by substituting sight slots made of transparent material, thereby also providing better protection for the pouch contents.

Accordingly, the present invention is directed to a reusable routing pouch, comprising a receptacle having a front, a back and an opening, an indicated address block on the back of the receptacle and a closure flap for covering the opening, the closure flap having a transparent portion whereby the transparent portion, when the closure flap is closed, covers the address block on the back of the receptacle. The indicated address block may comprise a layer of erasable material and there may be a layer of stiffening material below the layer of erasable material. The reusable routing pouch may further comprise one or more sight slots through its material wherein the sight slots are made of transparent material. The sight slots may also be aligned in corresponding pairs of front and back sight slots. The routing pouch may be made primarily of erasable material and may be made primarily of tear-resistant material. The pouch may also include a hook and loop type fastener for securing the closure flap to the front of the receptacle.

The invention is also directed to a reusable routing pouch, comprising a receptacle having a front, a back and an opening, and made primarily of a receptacle material, an indicated address block on the back of the receptacle comprising a layer of erasable material, a layer of stiffening material below the layer of erasable material, a closure flap for covering the opening, the closure flap having a transparent portion whereby the transparent portion, when the closure flap is closed, covers the address block on the back of the receptacle and sight slots through the receptacle material, wherein the sight slots are made of transparent material and are aligned in corresponding pairs of front and back sight slots.

The invention is further directed to a reusable routing pouch and apparatus for using, comprising a receptacle having an opening, wherein the receptacle is made of a material erasable by adhesive removal and a roller having an adhesive coating on its surface.

The invention yet further directed to a reusable routing pouch and apparatus for using comprising a receptacle having an opening, wherein the receptacle is made of material easily erasable by adhesive removal, a closure flap for covering the opening and sight slots through the receptacle material, wherein the sight slots are made of transparent material.

The invention is still further directed to a method for removing markings from a reusable routing pouch made of a material erasable by adhesive removal, comprising the step of rolling over the markings a cylinder having an adhesive coating on its surface.

The invention is also directed to a method for removing markings from a reusable routing pouch made of a material erasable by wiping with a solvent, comprising the step of wiping the routing pouch material with a means for wiping impregnated with a suitable solvent.

DESCRIPTION OF THE DRAWINGS

The present invention will be more clearly understood from a reading of the following detailed description in conjunction with the accompanying drawings wherein.

DETAILED DESCRIPTION

Figure 1:
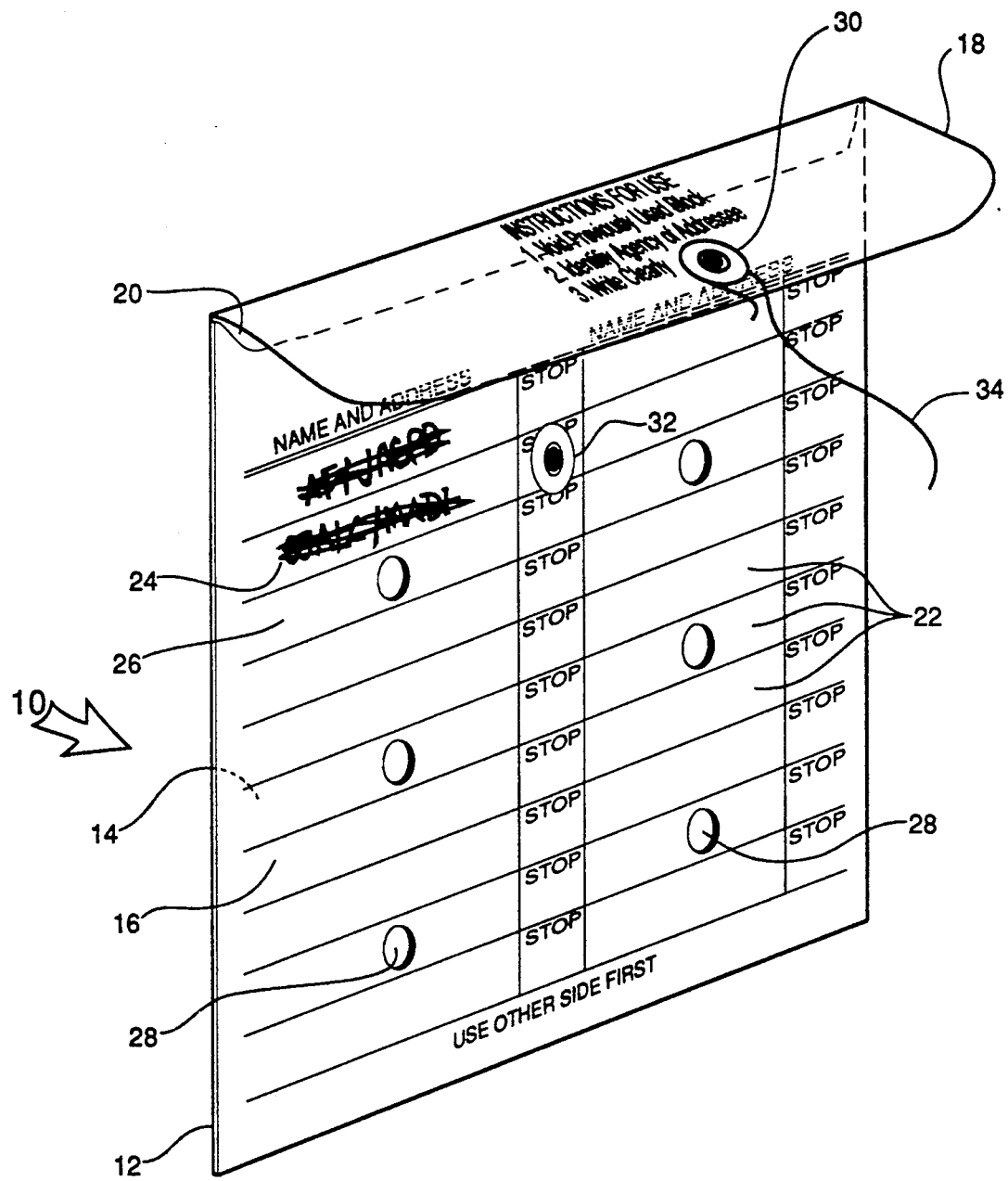
FIG. 1 is a perspective view of a prior art reusable routing envelope.

Referring now to FIG. 1 of the drawings, there is shown a perspective view of a prior art reusable routing envelope 10. Kraft paper-like material 12 is folded and sealed to form a receptacle in the shape of an envelope for holding Papers or other generally flat material. The front 14 of envelope 10 is longer than the back 16 to form a closure flap 18 which, when folded over, closes opening 20. Printed on both the front and back of envelope 10 are address blocks 22 sequentially arranged so that last used address block 24 and the next available address block 26, are readily apparent. Also printed on front and back are instructions and additional details to aid in more accurately describing destination addresses.

View holes 28, arranged in two vertical columns through the front 14 and back 16 of envelope 10 make easy determining whether or not envelope 10 is empty.

Fiber material buttons 30 and 32 are grommeted, respectively, to the back of envelope 10 and to the outside of flap 18. A string 34 is permanently attached to button 30 so that, when flap 18 is closed, the free end of string 34 can be found around button 32 to secure flap 18.

Figure 2:
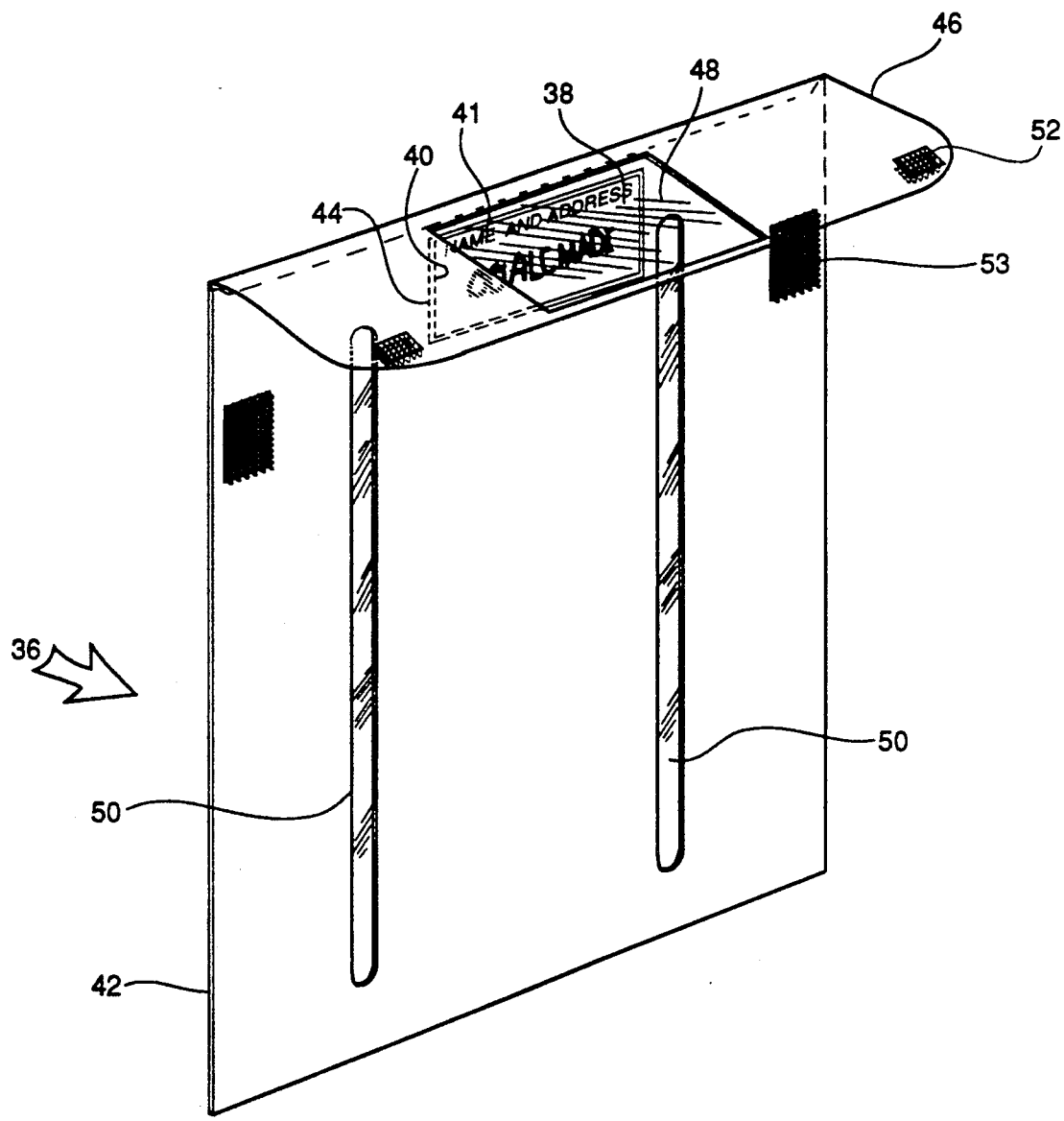
FIG. 2 is a perspective view of a reusable routing pouch made according to the teachings of the present invention showing the easily erasable address block the transparent portion of the closure flap and the sight slots; and, FIG. 3 is a perspective view of another reusable routing pouch made according to the teachings of the present invention, showing the routing pouch made nearly entirely of a material erasable by adhesive removal and an adhesive-coated roller for erasing the routing pouch.

FIG. 2 shows a reusable routing pouch, or receptacle, 36 made according to the teachings of the present invention. Instead of a series of address blocks printed over the entire envelope, a single address block 38 is indicated on a layer of easily erasable material 40 laminated over the primary receptacle material 42 of pouch 36. The indication may be by written instructions 41, as shown, by simply printing a heavy outline of a block or by a variety of various means that will occur to those with skill in the relevant art. Easily erasable material 40 will typically be a polyethylene or polyester plastic, or any suitable material from which marker type ink can be easily wiped off with, for example a rag or tissue. Suitable materials are commonly used on whiteboards. A stiffening layer 44 may be laminated between pouch material 42 and erasable material 40 to make writing easier.

Closure flap 46 includes a transparent portion 48 which, when closure flap 46 is in the closed position, covers address block 38. Transparent portion 48 may be made of any suitable transparent plastic material. Transparent portion 48 both reveals the destination information written in address block 38 and protects the written information from being smeared or smudged. Transparent portion 48 is longer than address block 38 so that when pouch 36 bulges from overstuffing address block 38 will remain visible.

Reusable routing pouch 36 also includes sight slots 50, covered by the same or similar transparent material used in closure flap transparent portion 48, which sight slots 50 extend in vertical columns nearly the entire length of pouch 36. By being transparent, sight slots 50 perform the same function as view holes, but do not sacrifice protection of any contents. Further, by being covered by continuous material, sight slots 50 reveal more of the interior of pouch 36 without materially sacrificing strength as would happen if conventional holes were extended into slots or otherwise made larger.

Reusable routing pouch 36 also includes hook 52 and loop 53 type fasteners, such as Velcroe ® brand, for holding closure flap 46 closed. The added convenience and ease of use of such typically more expensive fasteners is made affordable because pouch 36 will be used so many more times than present reusable envelopes. Loop sections 53 are made longer than hook sections 52 to accommodate bulging of pouch 38 from overstuffing.

The use of a separate plastic address block laminated to the pouch material permits the use of less expensive paper for the pouch material. Even though the substantially increased number of times the pouch may now be used makes the use of stronger and more water resistant plastic pouch materials now more economical paper envelopes may, in a particular environment, last long enough.

Figure 3:
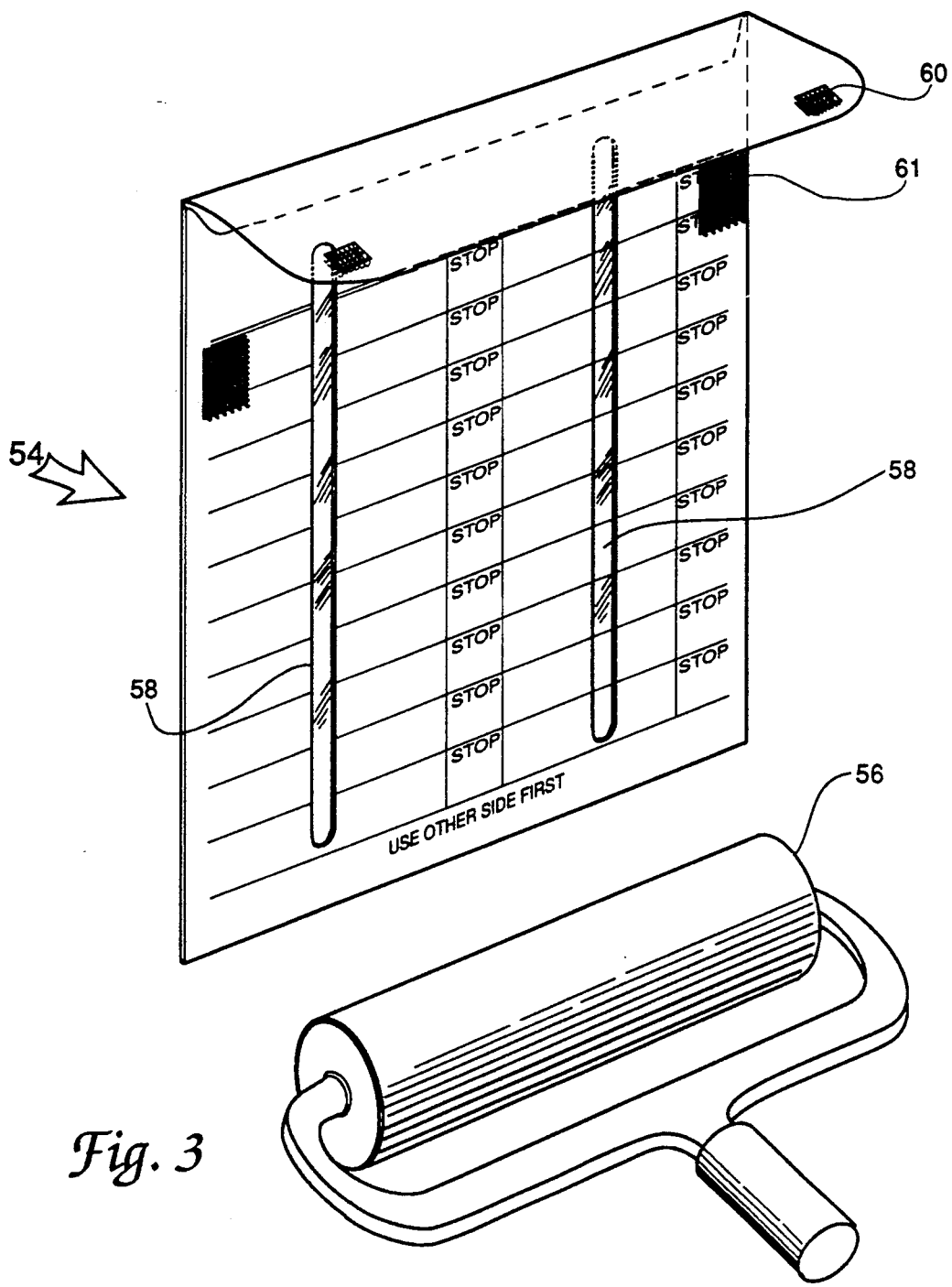

FIG. 3 is a perspective view of another reusable routing pouch 54 made according to the teachings of the present invention. Pouch 54 is made nearly entirely of a plastic the same or similar to that used for address block 38 in FIG. 2. preferably a high gloss plastic, with the difference that it is preferably less susceptible to erasure by mere wiping. This can be accomplished by selection of material and type of marker. Pouch 54 is preprinted with conventional sequentially arranged address blocks. Experiments show that permanent marker ink which is not easily removed by wiping can be removed by adhesive removal. Permanent marker ink has been successfully removed from Mylare brand polyester plastic with conventional clear adhesive tape using this method. An adhesive coated roller 56 can be simply rolled over pouch 54, after all the address blocks have been filled, to erase the blocks and ready pouch 54 for reuse.

Marker ink may also in some cases be removed by wiping with a cloth or sponge impregnated with a suitable solvent.

Pouch 54 also shows the use of transparent sight slots 58 and hook 60 and loop 61 type closure flap fasteners.

The disclosed reusable routing pouches successfully demonstrate the solution of making a previously limiting element of a reusable device itself reusable. Although the disclosed use is specialized, its teachings will find application in other areas where limits exist on the number of times a desired reusable device can be used.

The terms envelope and receptacle, as used in this description are intended to include any size and shape container to which the teachings of the invention may be applied. Those with skill in the art of the invention will see that such other sizes can include, for example, large boxes and shipping containers. Similarly, the term address block is intended to include shapes other than the simple rectangle implied by the word block.

It is understood that modifications to the invention as described may be made as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. A reusable routing pouch, comprising:
   (a) a receptable having a front, a back and an opening;
   (b) an indicated address block on the back of the receptable comprising a permanently attached layer of erasable material;
   (c) a closure flap for covering the opening, the closure flap having a transparent portion whereby the transparent portion, when the closure flap is closed, covers and protects the address block on the back of the receptacle;
   (d) wherein the receptacle is made primarily of a receptacle material, further comprising one or more sight slots through the receptacle material; and,
   (e) wherein the sight slots are covered by transparent material.

2. A reusable routing pouch, comprising:
   (a) a receptacle having a front, a back and an opening;
   (b) an indicated address block on the back of the receptacle comprising a permanently attached layer of erasable material;
   (c) a closure flap for covering the opening, the closure flap having a transparent portion whereby the transparent portion, when the closure flap is closed, covers and protects the address block on the back of the receptacle;
   (d) wherein the receptacle is made primarily of a receptacle material, further comprising one or more sight slots through the receptacle material, wherein the sight slots are covered by transparent material; and,
   (e) wherein the sight slots are aligned in corresponding pairs of front and back sight slots.

3. A reusable routing pouch, comprising:
   (a) a receptacle having a front, a back and an opening, and made primarily of a receptacle material;
   (b) an indicated address block on the back of the receptacle comprising a permanently attached layer of erasable material;
   (c) a layer of stiffening material below the layer of erasable material;
   (d) a closure flap for covering the opening, the closure flap having a transparent portion whereby the transparent portion, when the closure flap is closed, covers and protects the address block on the back of the receptacle; and,
   (e) sight slots through the receptacle material, wherein the sight slots are covered by transparent material and are aligned in corresponding pairs of front and back sight slots.

* * * * *

UNITED STATES PATENT AND TRADEMARK OFFICE
CERTIFICATE OF CORRECTION

PATENT NO. : 5,071,061
DATED : December 10, 1991
INVENTOR(S) : Dale R. Willis

It is certified that error appears in the above-indentified patent and that said Letters Patent is hereby corrected as shown below:

On the title page, please delete the following:
"[73] Assignee: The United States of America as represented by the Secretary of the Air Force, Washington, D.C.

Signed and Sealed this

Twelfth Day of October, 1993

Attest:

BRUCE LEHMAN

Attesting Officer

Commissioner of Patents and Trademarks